United States Patent
Kim et al.

(10) Patent No.: US 10,225,718 B2
(45) Date of Patent: Mar. 5, 2019

(54) DISPLAY DEVICE AND MOBILE DEVICE

(71) Applicant: LG ELECTRONICS INC., Seoul (KR)

(72) Inventors: Minwoo Kim, Seoul (KR); Seunghwan Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/648,363

(22) Filed: Jul. 12, 2017

(65) Prior Publication Data
US 2018/0020319 A1 Jan. 18, 2018

(30) Foreign Application Priority Data
Jul. 13, 2016 (KR) .................. 10-2016-0088370

(51) Int. Cl.
| | |
|---|---|
| *H04W 4/80* | (2018.01) |
| *H04W 8/00* | (2009.01) |
| *H04W 64/00* | (2009.01) |
| *G06Q 30/02* | (2012.01) |

(52) U.S. Cl.
CPC ............. *H04W 4/80* (2018.02); *H04W 8/005* (2013.01); *H04W 64/00* (2013.01); *G06Q 30/0261* (2013.01)

(58) Field of Classification Search
None
See application file for complete search history.

(56) References Cited

U.S. PATENT DOCUMENTS
2018/0041872 A1* 2/2018 Im ..................... H04W 64/00

FOREIGN PATENT DOCUMENTS
KR 20150117733 A * 10/2015

* cited by examiner

*Primary Examiner* — Mohammed Rachedine
(74) *Attorney, Agent, or Firm* — Lee, Hong, Degerman, Kang & Waimey

(57) ABSTRACT

A display device and a mobile device are disclosed. The display device comprises a memory; a display module; a communication module performing communication with at least one server; and a controller controlling the memory, the display module and the communication module. Particularly, the controller changes a content output through the display module in accordance with position information of the mobile device, which is received from the server.

8 Claims, 13 Drawing Sheets

FIG. 2

Area of Interest

| BD Address[2] (Mac) | Location | RSSI Min | RSSI Max |
|---|---|---|---|
| BC04-ROM | Display#1-1 | -70 | -30 |
| BC05-KET | Display#1-2 | -50 | -40 |

FIG. 3

| UUID[3] (user equipment information) | user information | purchasing grade | preference information | content position |
|---|---|---|---|---|
| abcd-efgh... | male/28 | silver | climbing clothes | 1 |
| zxyt-uirs... | female/43 | gold | women's clothing | 4 |

FIG. 11
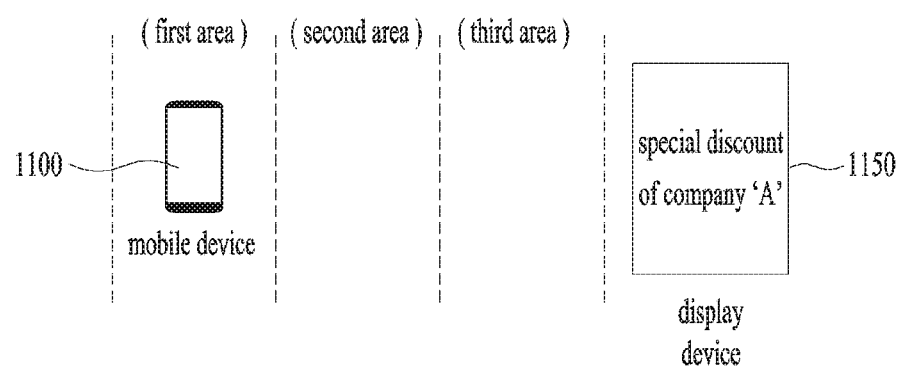
(a)
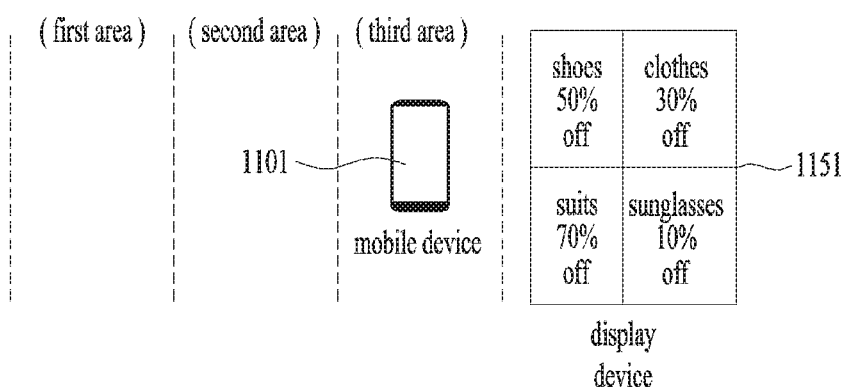
(b)

FIG. 14
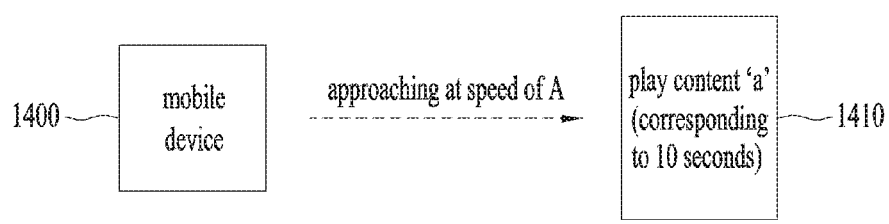
(a)
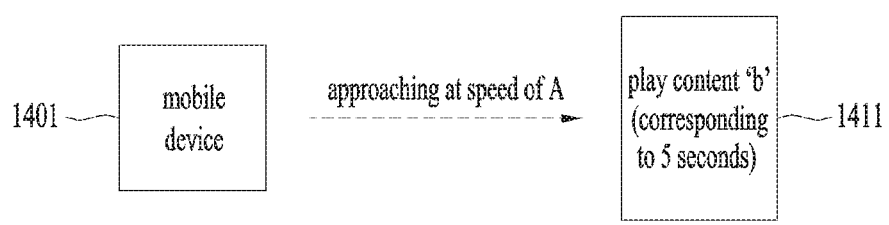
(b)

DISPLAY DEVICE AND MOBILE DEVICE

CROSS REFERENCE TO RELATED APPLICATIONS

Pursuant to 35 U.S.C. § 119(a), this application claims the benefit of earlier filing date and right of priority to Korean Application No. 10-2016-0088370, filed on Jul. 13, 2016, the contents of which are all hereby incorporated by reference herein in its entirety.

BACKGROUND OF THE INVENTION

Field of the Invention

The present invention relates to a display device and a mobile device, and more particularly, to a display device applicable to a technical field that provides actively changed contents in accordance with a position of a mobile device.

Discussion of the Related Art

A digital signage which is an example of a display device refers to a digital notice board that provides various kinds of information and advertisements by using a digital player instead of existing analog advertisement boards such as poster, guide display, and signboard. The digital signage is characterized in that the digital signage is connected to a network and can control contents at one time remotely, and is effective to provide advertisements and contents owing to excellent information transfer based on outstanding attention. As the case may be, the digital signage may be referred to as narrowcasting, screen media, place-based media, and digital media networks.

Also, the aforementioned display device or digital signage may be referred to as a digital information display (DID).

Although an initial digital signage had only delivered input information, the digital signage has been developed to a service, which performs a personal media function through bidirectional communication in accordance with combination with a touch panel, and therefore has been spotlighted as a bidirectional communication means.

Moreover, the digital signage has been used even at a theater, restaurant, school (electronic bulletin board), and its utility has been increased gradually. Digital signage related business providers have enlarged association of the digital signage with new technologies such as near-field communication (NFC), gesture recognition technology, user behavior analysis, and face recognition.

Therefore, a system that a mobile device and a display device (ex: digital signage and DID) interwork with each other has been recently discussed.

However, GPS based position tracing is easily performed outdoor not indoor, whereas a solution that a display device located indoor detects proximity of a mobile device has not been constructed well in the related art.

Also, since the same contents are provided after a display device located indoor determines proximity of a mobile device, a problem occurs in that needs of various users are not fulfilled sufficiently.

SUMMARY OF THE INVENTION

Accordingly, the present invention is directed to a display device and a mobile device, which substantially obviate one or more problems due to limitations and disadvantages of the related art.

An object of the present invention is to provide a new positioning method in which a display device determines a short distance position of a mobile device in an indoor environment where GPS signal reception is weak.

Another object of the present invention is to provide a system that is constructed at a minimum cost to implement the new positioning method for determining a short distance position.

Other object of the present invention is to provide a technology for providing contents varied in accordance with a type (ID) of a mobile device located indoor, moreover in accordance with a distance between the mobile device and a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to one embodiment of the present invention comprises a memory; a display module; a communication module performing communication with at least one server; and a controller controlling the memory, the display module and the communication module, wherein the controller changes a content output through the display module in accordance with position information of the mobile device, which is received from the server.

The position information of the mobile device is determined using relative signal strength between at least two short distance communication modules installed near the display device and the mobile device.

It is determined that the mobile device is located in an area of interest of the display device if a difference between an absolute value of signal strength between the first short distance communication module and the mobile device and an absolute value of signal strength between the second short distance communication module and the mobile device corresponds to a predetermined range.

The area of interest is grouped by a plurality of areas in accordance with signal strength.

The first short distance communication module and the second short distance communication module correspond to beacons that enable Bluetooth communication, and are installed near the display device.

The communication module receives a specific content corresponding to ID of the mobile device from the server, and the controller controls the display module to output the received specific content.

The controller controls the display module to output different contents in accordance with a distance between the mobile device and the display device.

The controller changes a play time of the content output through the display module on the basis of at least one of a moving direction and speed of the mobile device.

The controller controls the display module to selectively output the content in accordance with a display-on/off of the mobile device.

The display device corresponds to at least one of a digital signage, a monitor and a TV.

According to one embodiment of the present invention, a new positioning method is provided in which a display device determines a short distance position of a mobile device in an indoor environment where GPS signal reception is weak.

According to another embodiment of the present invention, a system can be constructed at a minimum cost to implement the new positioning method for determining a short distance position.

According to other embodiment of the present invention, contents varied in accordance with a type (ID) of a mobile device located indoor, moreover in accordance with a distance between the mobile device and a display device are provided.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein:

FIG. 2 illustrates a database required for a display device to detect proximity of a mobile device in accordance with one embodiment of the present invention;

FIG. 3 illustrates a database required for a display device to provide mobile device customized contents in accordance with one embodiment of the present invention;

FIG. 11 illustrates that a display device according to one embodiment of the present invention provides different contents in accordance with a proximity distance of a mobile device;

FIG. 14 illustrates that a display device according to one embodiment of the present invention provides different contents in accordance with a proximity speed of a mobile device.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" should be understood that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Mobile terminals described in this specification may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

Figure 1:
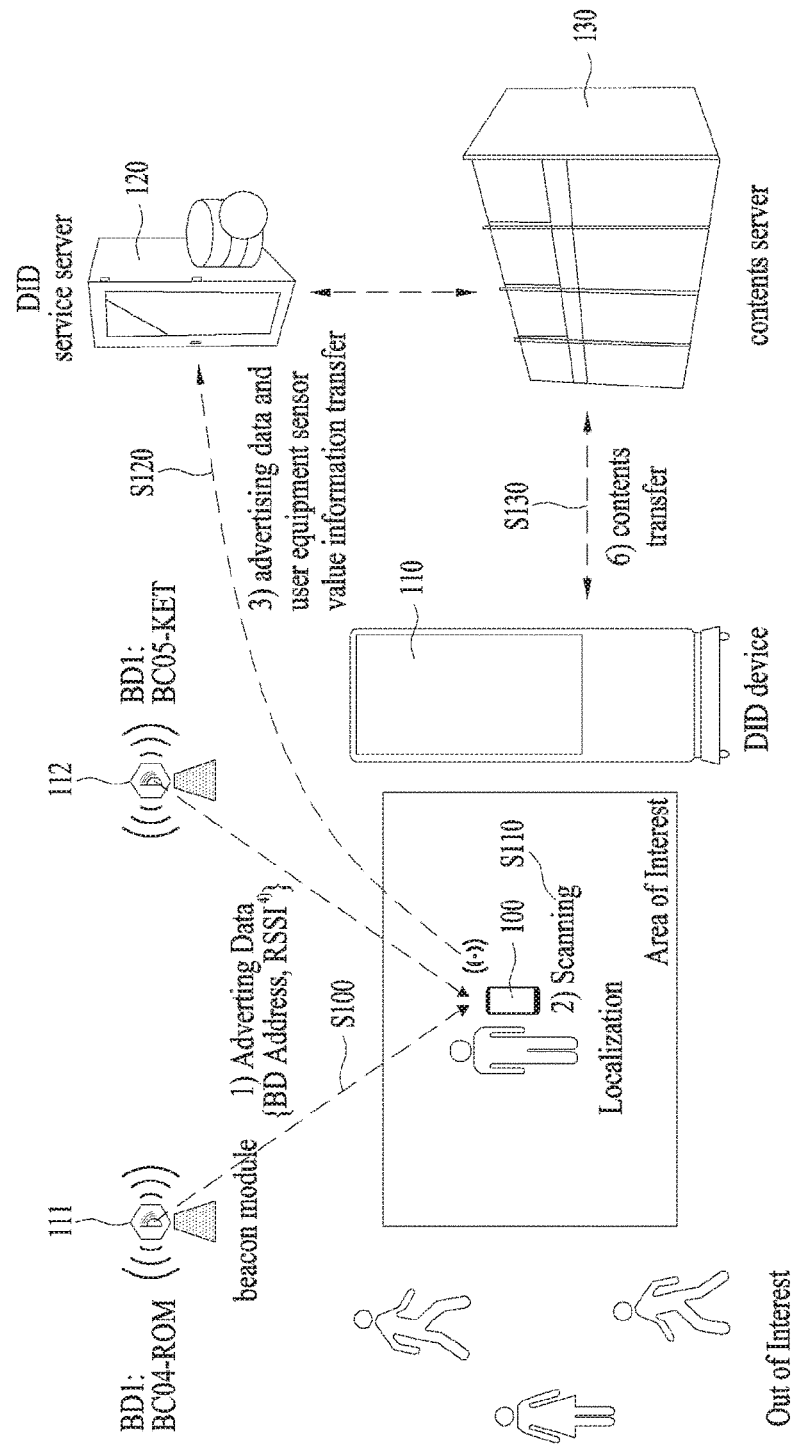
FIG. 1 briefly illustrates a user customized contents transmission and reception system of a display device according to one embodiment of the present invention.

FIG. 1 briefly illustrates a user customized contents transmission and reception system of a display device according to one embodiment of the present invention.

The present invention relates to a system that includes a display device that can identify a short distance user, and more particularly, is to provide a user customized contents service that identifies a user (who owns a mobile device) located near the display device and reflects preference (or user information) of the identified user. Particularly, a new solution for an indoor short distance positioning method is defined, and will be described in detail with reference to FIG. 7. The indoor short distance positioning method is effective in an indoor environment that is not affected by a global positioning system (GPS) signal and is advantageous in that the cost can be saved.

As shown in FIG. 1, the system of the present invention includes a mobile device 100, a display device 110, a first beacon module 111, a second beacon module 112, a service server 120, and a contents server 130. The display device 110 corresponds to a digital information display (DID) device, for example, and the first beacon module 111 and the second beacon module 112 may be designed in such a manner that they are installed near or attached to the display device 110. Moreover, although a plurality of servers 120 and 130 are illustrated in FIG. 1, one server may be designed in accordance with the need of the person skilled in the art within the other scope of the present invention.

First of all, the embodiment that the display device 110 determines whether the mobile device 100 has been located near the display device 110, by using the two beacon modules 111 and 112 will be described.

The beacon modules 111 and 112 installed near or attached to the display device 110 can perform Bluetooth communication, and transmit a certain signal to the periphery of the display device 110 (S100). At this time, the beacon modules 111 and 112 transmit a scanning result (S110) of the mobile device 100, Bluetooth Device (BD) address, received signal strength indicator (RSSI), and a sensing value of the mobile device 100 to the service server 120 (S120). Also, information (for example, Universally Unique Identifier (UUID)) that can identify the mobile device 100 may also be transmitted at the step S120.

The service server 120 determines whether the mobile device 100 is located near the display device 110, with reference to a database shown in FIG. 2.

The contents server 130 transmits a specific content optimized for the mobile device 100 to the display device 110 with reference to a database shown in FIG. 3.

Meanwhile, the database of FIGS. 2 and 3 will be described hereinafter in more detail.

FIG. 2 illustrates a database required for a display device to detect proximity of a mobile device in accordance with one embodiment of the present invention.

The display device 110 or the service server 120 shown in FIG. 1 stores the database shown in FIG. 2 in a memory.

Moreover, as shown in FIG. 2, Bluetooth device (BD) address, position information of the Bluetooth device and signal strength range (RSSI Min and RSSI Max) for determining whether a random mobile device is located at a short distance are mapped.

For example, if a first Bluetooth device (for example, beacon module) is located at a left side (Display#1-1) of a first display device and has signal strength with a random mobile device in the range of −70 to −30, it may be determined that the random mobile device is located at a short distance from the first display device.

Moreover, if a second Bluetooth device (for example, beacon module) is located at a right side (Display#1-2) of the first display device and has signal strength with a random mobile device in the range of −50 to −40, it may be determined that the random mobile device is located at a short distance from the first display device.

Otherwise, as another embodiment, if the random mobile device has signal strength in the range of −70 to −30 as a result of communication between the random mobile device and the first Bluetooth device, and if the random mobile device has signal strength in the range of −50 to −40 as a result of communication between the random mobile device and the second Bluetooth device, it may be determined that the random mobile device is located at a short distance from the first display device.

Otherwise, as still another embodiment, if a difference value between an absolute value BD1_RSSI1 of signal strength recognized as a result of communication between the random mobile device and the first Bluetooth device and an absolute value BD2_RSSI2 of signal strength recognized as a result of communication between the random mobile device and the second Bluetooth device satisfies a predetermined range, it may be determined that the random mobile device is located at a short distance from the first display device.

Finally, the technology for detecting proximity between the mobile device and the display device by additionally using sensing information (for example, directionality information recognized by a gyro sensor, motion information recognized by an acceleration sensor, etc.) of the mobile device in addition to the signal strength value shown in FIG. 2 pertains to the other scope of the present invention. This will be described in more detail with reference to FIG. 7.

FIG. 3 illustrates a database required for a display device to provide mobile device customized contents in accordance with one embodiment of the present invention.

The service server 120 or the contents server 130 shown in FIG. 1 stores the database shown in FIG. 3 in a memory.

Moreover, as shown in FIG. 3, user information (for example, gender, age, etc.), a purchasing grade (annually or monthly purchasing history information), preference information (for example, preferred clothes, goods, etc.) and a content position are mapped in accordance with identification information (for example, UUID, terminal information) of a mobile device.

Meanwhile, the content position may mean a floor of a shop where a specific content (product) based on preference information preferred by a user of a specific mobile device is located.

Therefore, if the specific mobile device 100 (for example, UUID: abcd-efgh . . . ) is recognized near the display device 110, the display device 110 is designed to output climbing clothes related information preferred by a user of the specific mobile device 100 with reference to the DB shown in FIG. 3. Moreover, information for identifying that a position where the climbing clothes are sold is a first floor may also be displayed with reference to the DB shown in FIG. 3.

Meanwhile, as another example, if the specific mobile device 100 (for example, UUID: zxyt-uirs . . . ) is recognized near the display device 110, the display device 110 is designed to output women's clothing related information preferred by a user of the specific mobile device 100 with reference to the DB shown in FIG. 3. Moreover, information for identifying that a position where the women's clothing is sold is a fourth floor may also be displayed with reference to the DB shown in FIG. 3.

Figure 4:
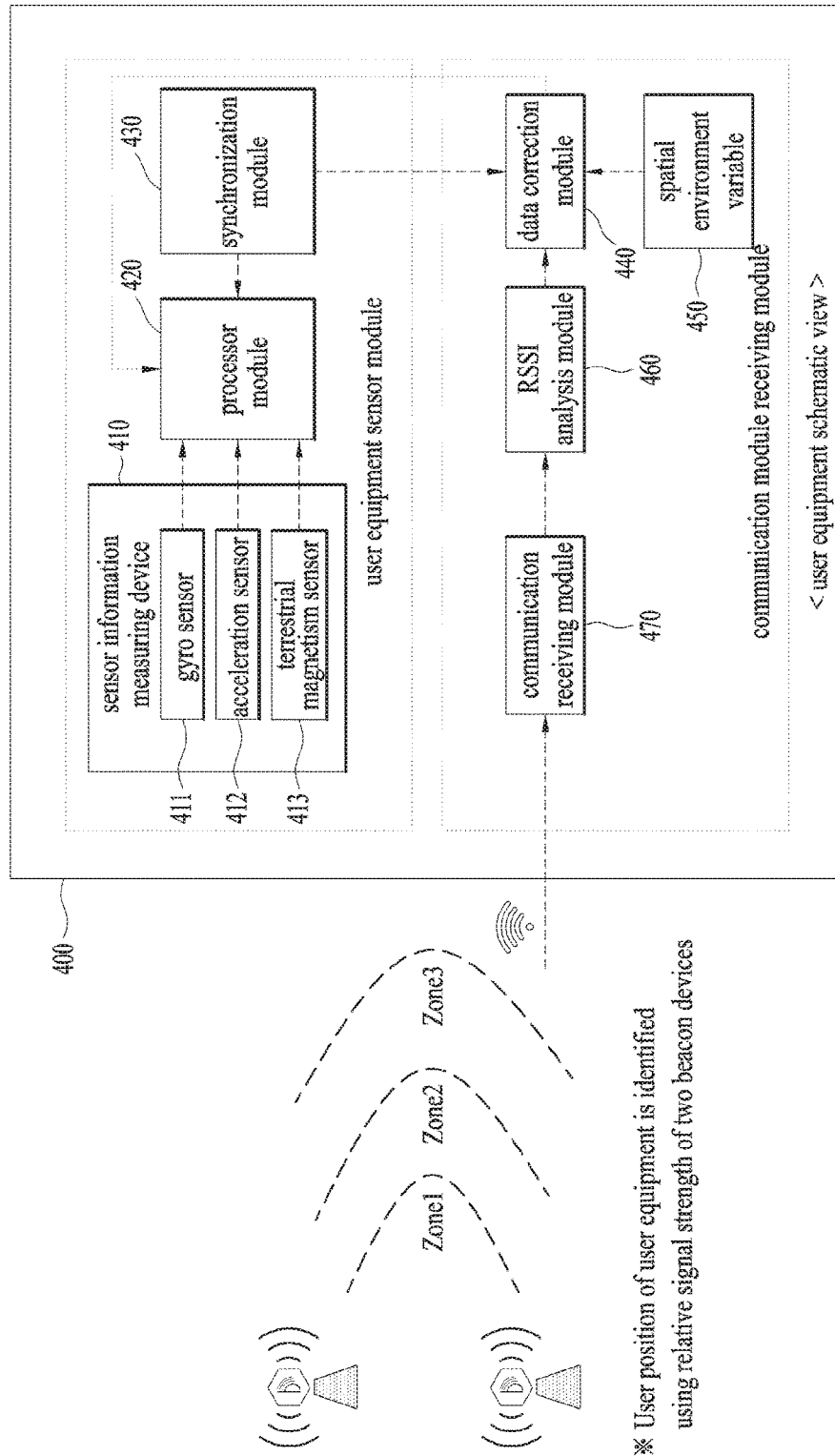
FIG. 4 is a detailed block diagram illustrating inner configuration modules of a mobile device according to one embodiment of the present invention.

FIG. 4 is a detailed block diagram illustrating inner configuration modules of a mobile device according to one embodiment of the present invention.

As described above, a problem occurs in that exact position recognition is not possible in an indoor environment that GPS (Global Positioning System) position recognition technology which is the positioning technology according to the related art is not used.

Therefore, to solve this problem, the present invention newly suggests an indoor combining positioning technology using a wireless communication module (for example, Bluetooth device and beacon module) and a mobile device, thereby enabling a user customized contents service having more enhanced accuracy. To this end, an example of a mobile device which is required will be described with reference to FIG. 4.

As shown in FIG. 4, the mobile device 400 according to one embodiment of the present invention includes a sensor information measuring device 410, a processor module 420, a synchronization module 430, a data correction module 440, a spatial environment variable 450, an RSSI analysis module 460, and a communication receiving module 470. The processor module 420 may be a CPU, a controller, or the like.

Particularly, the communication receiving module 470 is designed to enable Bluetooth communication, and may receive a signal from a plurality of beacons 480 and 490. Also, the RSSI analysis module 460 may predict the position of the mobile device 400 by using relative signal strength recognized from a first beacon 480 and a second beacon 490. This will be described in more detail with reference to FIG. 7.

Moreover, the aforementioned sensor information measuring device 410 includes a gyro sensor 411, an acceleration sensor 412, and a terrestrial magnetism sensor 413. The gyro sensor 411 is used to detect directionality of the mobile device 400, the acceleration sensor 412 is used to detect motion of the mobile device 400, and the terrestrial magnetism sensor 413 is used to detect terrestrial magnetism. An example of the terrestrial magnetism sensor 413 includes a guideline, and may directly detect a direction of the terrestrial magnetism and sense a size from a vibration cycle. In more detail, examples of the terrestrial magnetism sensor 413 include a flux gate magnetometer based on magnetic saturation of a ferromagnetic substance of a magnetism using a rotational coil, a quantum magnetometer based on nuclear magnetic resonance of a proton, and an optical pumping magnetometer based on Zeeman effect of a rubidium or cesium atom.

Moreover, the sensor information measuring device 410 may include one or more sensors for sensing at least one of internal information of the mobile device 400, surrounding environment information of the mobile device 400, and user information. For example, a sensing module 140 may include at least one of a proximity sensor, an illumination sensor, a touch sensor, a gravity sensor (G-sensor), a gyroscope sensor, a motion sensor, an RGB sensor, an infrared (IR) sensor, a finger scan sensor, an ultrasonic sensor, an optical sensor (for example, camera), a microphone, a battery gauge, an environment sensor (for example, barometer, hygrometer, thermometer, radioactivity detecting sensor, a heat detecting sensor, a gas detecting sensor, etc.), and a chemical sensor (for example, electronic nose, health care sensor, biometrics sensor, etc.). Meanwhile, the mobile device disclosed in this specification may use information sensed by at least one or more of the above sensors, in combination.

Also, the present invention is designed such that a proximity distance between the beacons 480 and 490 and the mobile device 400 is divided into a plurality of levels to provide different services. This will be described later with reference to FIG. 11.

Figure 5:
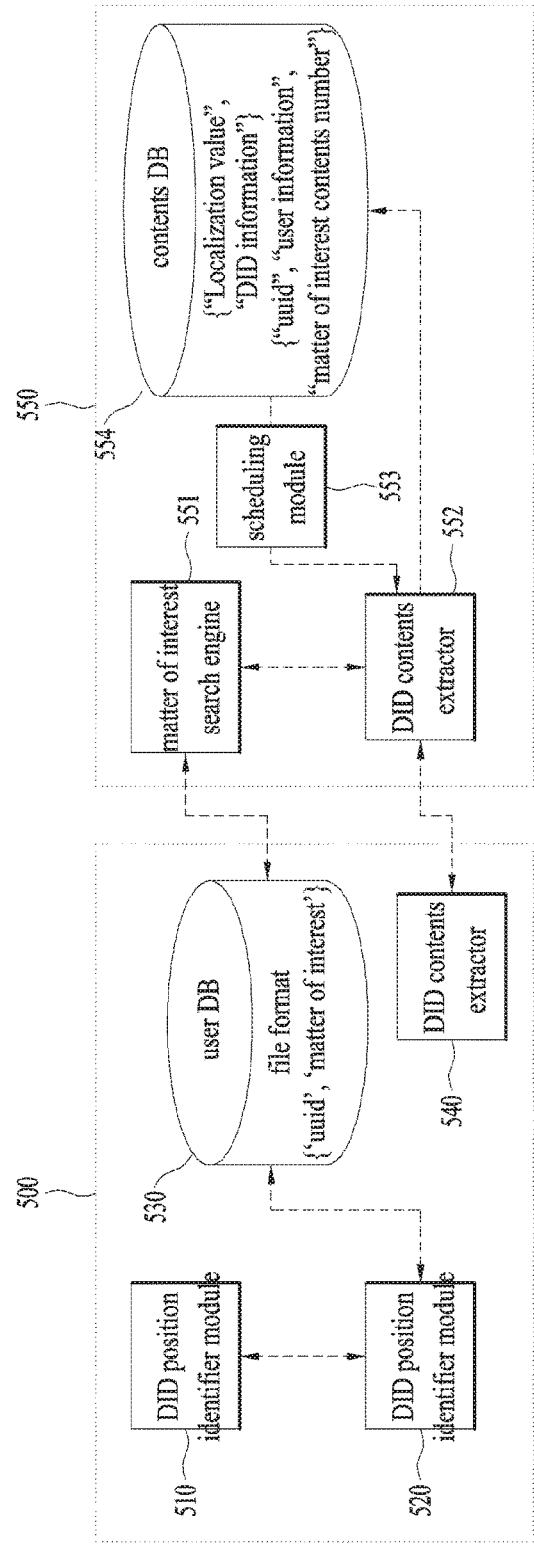
FIG. 5 is a detailed block diagram illustrating inner configuration modules of a plurality of servers according to one embodiment of the present invention.

FIG. 5 is a detailed block diagram illustrating inner configuration modules of a plurality of servers according to one embodiment of the present invention.

As shown in FIG. 5, two kinds of servers are used in the system of the present invention. Although a service server 500 and a contents server 550 are respectively shown in FIG. 5, one server may be implemented in accordance with the need of the person skilled in the art within the other scope of the present invention.

The service server 500 may be referred to as a digital information display (DID) service server. The service server 500 includes a DID position identifier module 510, a user identifier module 520, a user DB 530, and a contents output controller 540. Addition, deletion and modification of some modules in accordance with the need of the person skilled in the art pertain to the other scope of the present invention.

The DID position identifier module 510 determines whether the mobile device has approached near the display device, in accordance with an RSSI signal strength value received from the mobile device.

The user identifier module 520 identifies features of a user who owns the mobile device, on the basis of ID or UUID received from the mobile device. However, a matter of interest per UUID is stored in the user DB 530 in a mapped state. For example, the database shown in FIG. 3 corresponds to the user DB 530.

The contents output controller 540 controls a contents extractor 552 of the contents server 550 and transmits a content specialized for a specific mobile device to the display device.

Meanwhile, the contents server 550 includes a matter of interest search engine 551, a contents extractor 552, a scheduling module 553, and a contents DB 554. Of course, addition, deletion and modification of some modules in accordance with the need of the person skilled in the art pertain to the other scope of the present invention.

The matter of interest search engine 551 searches for a matter of interest of a user who owns a mobile device, with reference to the user DB 530, and the contents extractor 552 extracts an interest content of a specific user according to the search result of the matter of interest search engine 551 and transmits the extracted content to the display device.

Moreover, the contents extractor 552 controls a transmission timing and cycle of a specific content under the control of the scheduling module 553, and receives the specific content by accessing the contents DB 554.

Figure 6:
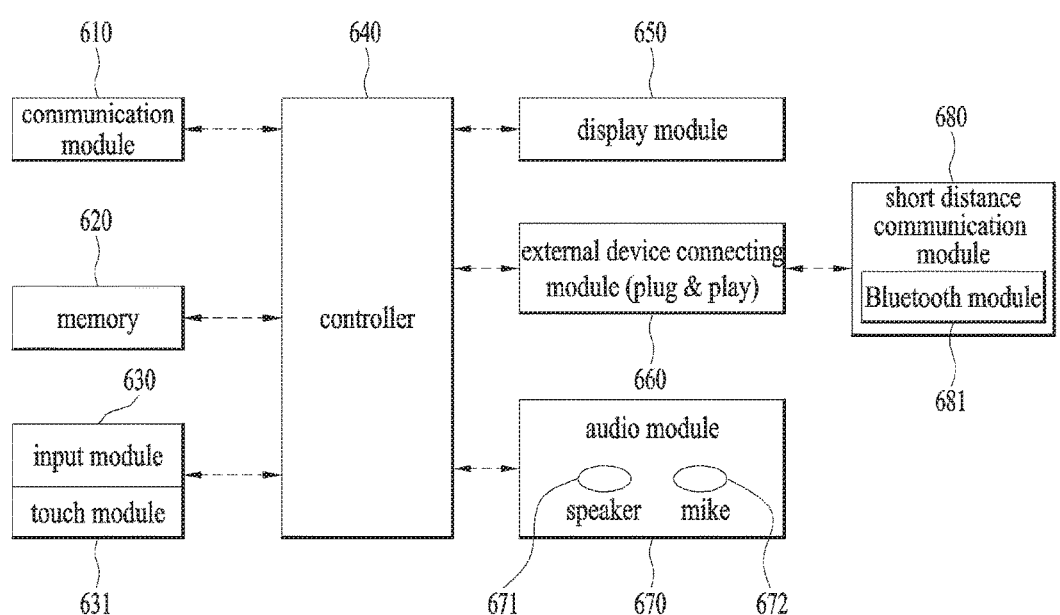
FIG. 6 is a detailed block diagram illustrating inner configuration modules of a display device according to one embodiment of the present invention.

FIG. 6 is a detailed block diagram illustrating inner configuration modules of a display device according to one embodiment of the present invention. As described above, addition, deletion and modification of some modules in accordance with the need of the person skilled in the art pertain to the other scope of the present invention.

The display device according to one embodiment of the present invention includes a communication module 610, a memory 620, an input module 630, a controller 640, a display module 650, an external device connecting module 660, an audio module 670, and a short distance communication module 680. Moreover, the input module 630 includes a touch module 631, for example, the audio module 670 includes a speaker 671, a mike 672, etc., and the short distance communication module 680 includes a Bluetooth module 681.

The memory 620 stores data supporting various functions of the display device. The memory 620 may store a plurality of application programs (or applications) driven by the display device and data and command languages for the operation of the display device. At least a part of the application programs may be downloaded from an external server through wireless communication. Meanwhile, the application program is stored in the memory 620, and may be driven by the controller 640 to perform the operation (or function) of the display device.

The controller 640 generally controls the overall operation of the display device in addition to the operation related to the application program. The controller 640 may process signal, data and information, which are input or output through the aforementioned elements or drive the application program stored in the memory 620, thereby providing the user of proper information or function or processing the information or function.

At least some of the aforementioned elements may be operated in cooperation with each other to operate or control the display device according to various embodiments, which will be described hereinafter, or implement a control method of the display device. Also, the operation, control or control method of the display device may be implemented on the display device by driving of at least one application program stored in the memory 620.

Moreover, the controller 640 outputs a content specialized for a user of the mobile device proximate to the display device by controlling the display module 650 or outputs different contents in accordance with an approach distance, speed, etc. Various embodiments regarding this will be described with reference to FIGS. 11 to 15.

Figure 7:
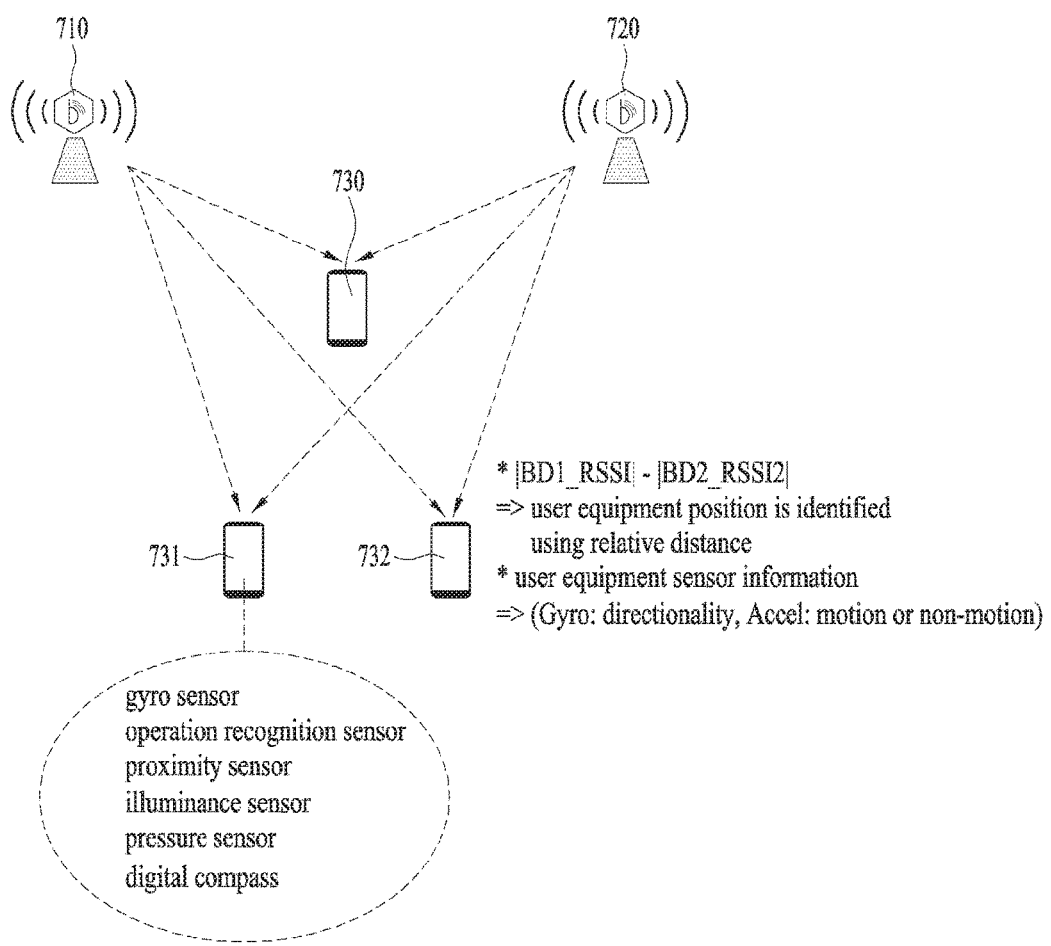
FIG. 7 illustrates that a display device according to one embodiment of the present invention detects proximity of a mobile device in an indoor environment.

FIG. 7 illustrates that a display device according to one embodiment of the present invention detects proximity of a mobile device in an indoor environment.

The conventional position tracing method using a GPS signal has a problem in that it is difficult to apply the conventional position tracing method to the indoor environment. As a method applicable to the indoor, a technology for identifying a position of a specific device using time of arrival (TOA) based three radio signals has been introduced. However, the conventional TOA method has a problem in that three beacons are required. Also, a problem occurs in that a TOA value exceeds a threshold value due to an obstacle located between a specific device and a beacon.

On the other hand, the embodiment of the present invention shown in FIG. 7 primarily determines a position of a mobile device through strength comparison of two radio signals and then secondarily determines more exact position using sensing information of the mobile device, unlike the radio signal based measurement technology (coordinate) of minimum three axes according to the related art.

The embodiment of the present invention will be described in more detail with reference to FIG. 7.

A relative value of RSSI signal strength between the mobile device and two beacons (Bluetooth device) 710 and 720 may be used to determine whether the mobile device has approached the two beacons.

For example, if a first mobile device 730 approaches the two beacons, a difference between an absolute value of RSSI signal strength between the first mobile device 730 and the first beacon 710 and an absolute value of RSSI signal strength between the first mobile device 730 and a second beacon 720 corresponds to a predetermined threshold value or less.

On the contrary, if a difference between an absolute value of RSSI signal strength between the second mobile device 731 and the first beacon 710 and an absolute value of RSSI signal strength between the second mobile device 731 and the second beacon 720 exceeds the predetermined threshold value, it may be estimated that the second mobile device 731 is spaced apart from the two beacons 710 and 720 at a considerable distance.

Likewise, if a difference between an absolute value of RSSI signal strength between a third mobile device 731 and the first beacon 710 and an absolute value of RSSI signal strength between the third mobile device 731 and the second beacon 720 exceeds the predetermined threshold value, it may be estimated that the third mobile device 731 is spaced apart from the two beacons 710 and 720 at a considerable distance.

However, as another embodiment of the present invention, there is an exceptional status that the distance between a random mobile device and the two beacons 710 and 720 cannot be estimated exactly by a difference only between an absolute value of RSSI signal strength between the random mobile device and the first beacon 710 and an absolute value of RSSI signal strength between the random mobile device and the second beacon 720. For example, if the mobile device is far away from the two beacons but is spaced apart from the beacons almost equally on the distance, a problem may occur. To solve this problem, the proximity sensor of the mobile device may be used to additionally secondarily determine whether the beacons approach the display device.

Moreover, as still another embodiment, if the mobile device is recognized through its gyro sensor or acceleration sensor as well as using the RSSI signal strength value as approaching the beacon or the display device although far away from the beacon or the display device on the distance, it may secondarily be determined that the mobile device approaches the beacon or the display device.

Therefore, according to the embodiment shown in FIG. 7 and the aforementioned embodiments, power consumption may be reduced as compared with the other wireless communication method, and two beacons instead of three beacons may be used to facilitate infrastructure construction.

Also, since position tracing may be performed even indoor as well as outdoor and a sensor of the mobile device is additionally used, the position of the mobile device can be detected more exactly.

Figure 8:
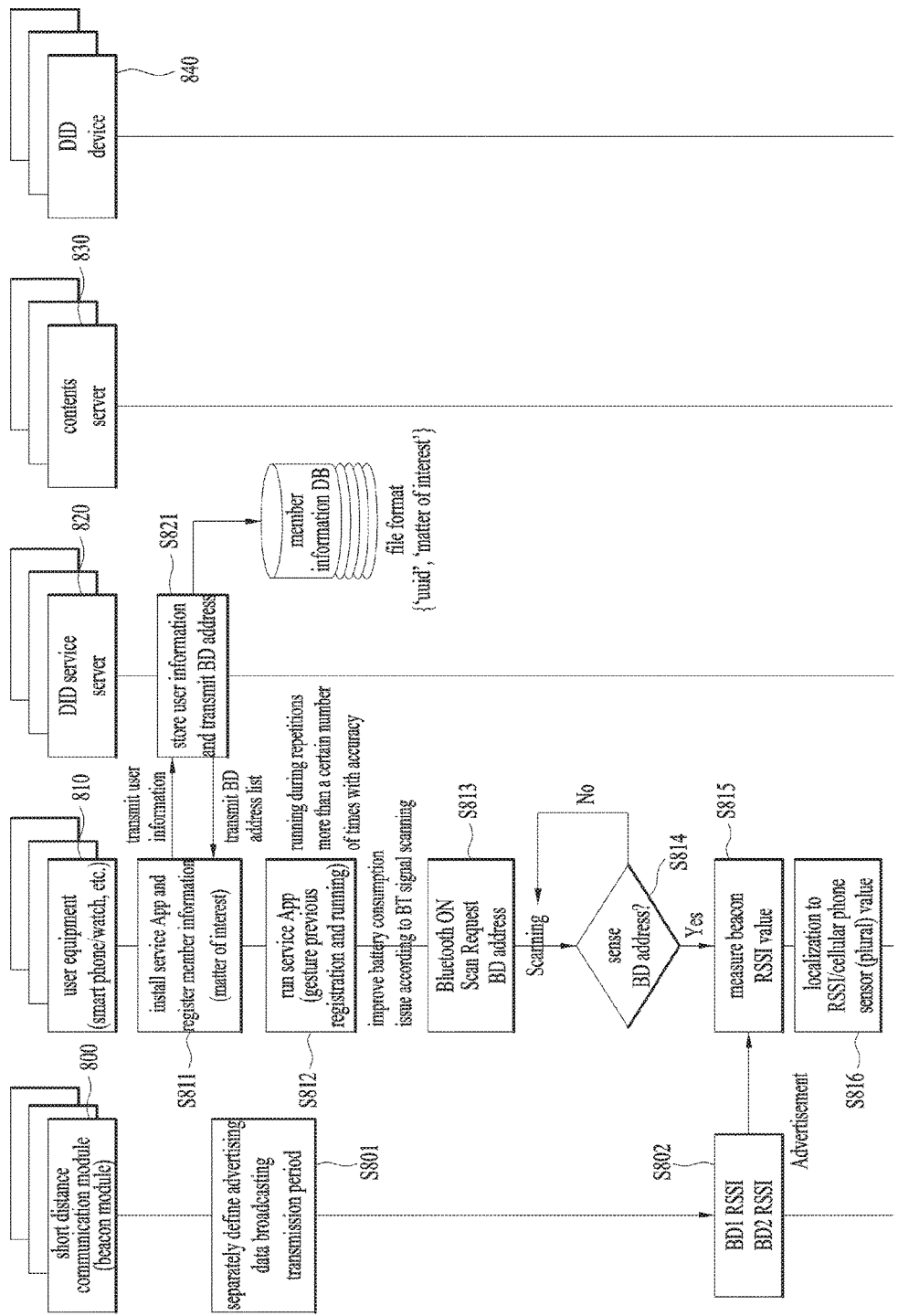
FIG. 8 is an example of a flow chart illustrating an operation flow of respective elements within a system according to one embodiment of the present invention.
Figure 9:
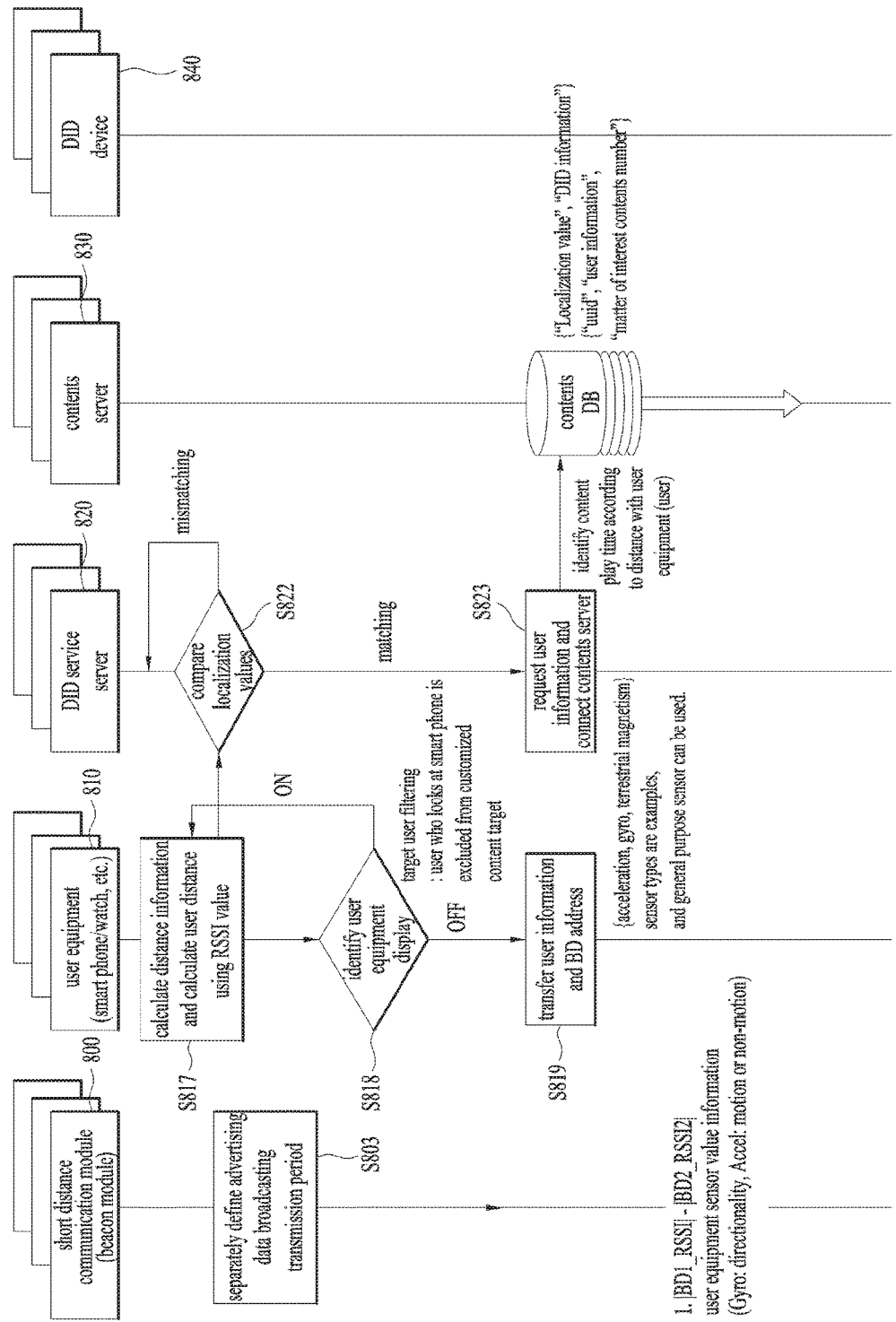
FIG. 9 is another example of a flow chart illustrating an operation flow of respective elements within a system according to one embodiment of the present invention.
Figure 10:
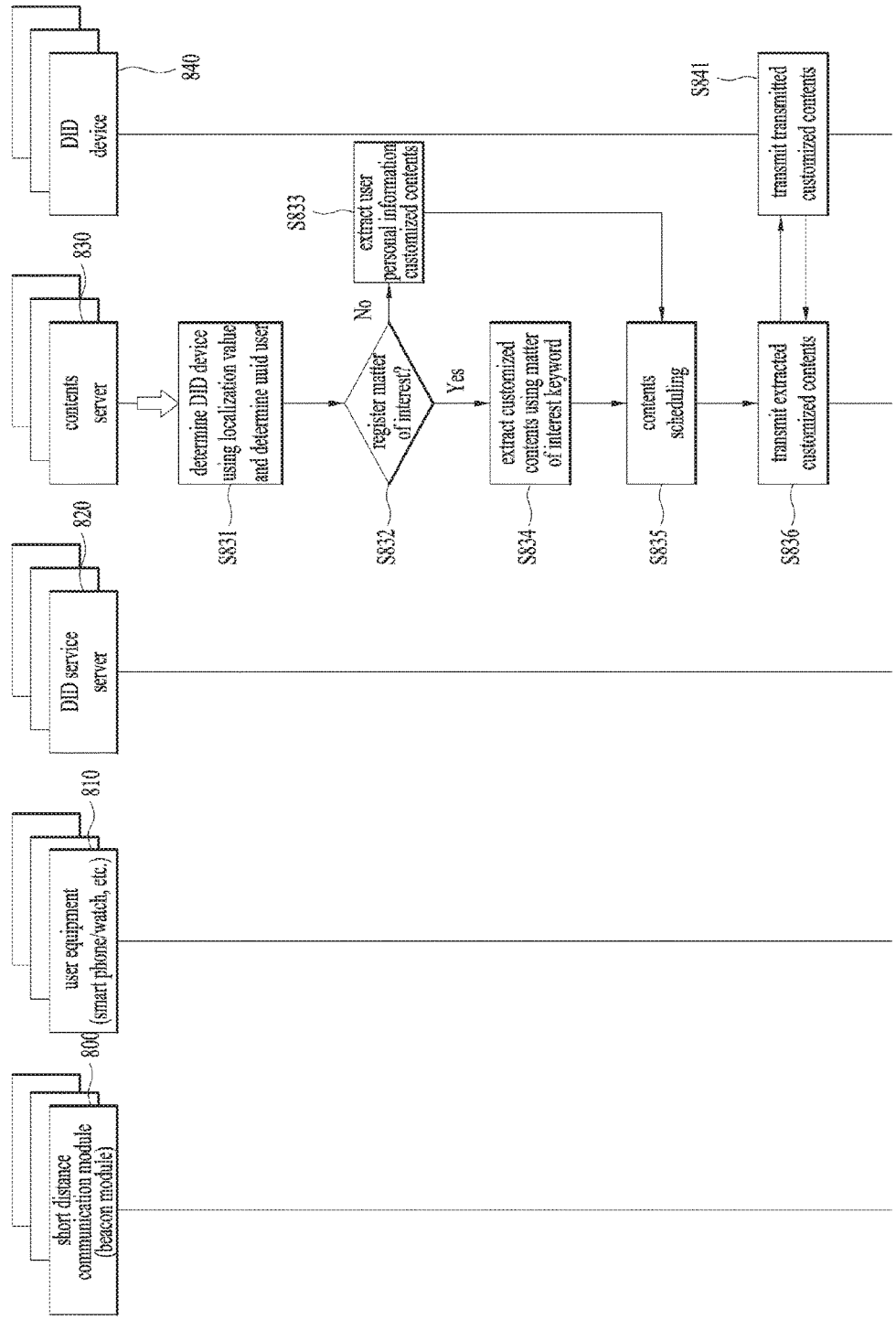
FIG. 10 is other example of a flow chart illustrating an operation flow of respective elements within a system according to one embodiment of the present invention.

FIG. 8 is an example of a flow chart illustrating an operation flow of respective elements within a system according to one embodiment of the present invention. For reference, flows of FIGS. 8, 9 and 10 are performed in due order. However, for convenience of description, FIG. 8, FIG. 9 and FIG. 10 will be described respectively. Also, FIGS. 8 to 10 may be construed complementarily with reference to FIGS. 1 to 7 within the scope of the present invention.

As described above, the system of the present invention shown in FIG. 8 includes a beacon module 800, a user equipment 810, a service server 820, a contents server 830, and a display device 840. The beacon module 800 may be replaced with a Bluetooth device that enables short distance communication. Moreover, the user equipment 810 corresponds to a mobile device, a smart phone, a watch, or the like. The display device 810 corresponds to at least one of a digital information display (DID) device, a digital signage, a monitor, and television (TV).

The user equipment 810 installs an application for implementation of the present invention and registers member information (for example, matter of interest information) (S811). Of course, it does not matter that a related application is previously installed or no application type is provided.

The service server 820 that has received user information from the user equipment 810 stores related information and transmits an address of a Bluetooth device (for example, beacon) to the user equipment 810 (S821). The received user information is stored in a type of database as described in detail with reference to FIG. 3.

If the user equipment 810 runs a related application (S812), a Bluetooth function is automatically turned on (S813) and scanning is performed.

The user equipment 810 determines whether the BD address received at the step S821 is sensed (S814). Meanwhile, the beacon module 800 broadcasts a signal (S801), a signal of a first beacon is transmitted to the user equipment 810 at BD1 RSSI signal strength, and a signal of a second beacon is transmitted to the user equipment 810 at BD2 RSSI signal strength (S802).

Moreover, if the BD address received from the service server is sensed as a result of the determined step (S814), the user equipment 810 measures an RSSI value received from the beacon modules (S815), and performs localization by using the measured RSSI value and a sensor value of the user equipment (S816). However, the localization method will be described in more detail with reference to FIG. 9.

FIG. 9 is another example of a flow chart illustrating an operation flow of respective elements within a system according to one embodiment of the present invention. For reference, flows of FIGS. 8, 9 and 10 are performed in due order. However, for convenience of description, FIG. 8, FIG. 9 and FIG. 10 will be described respectively. Also, FIGS. 8 to 10 may be construed complementarily with reference to FIGS. 1 to 7 within the scope of the present invention.

A description will be made based on the steps shown in FIG. 8. The user equipment calculates a distance with beacons or a display device installed near the beacons by using RSSI value with each beacon through communication with the beacons (S817). Depending on whether a relative difference value of RSSI absolute values with the respective beacons exceeds a predetermined threshold value, determination whether the mobile device is located near the display device (or beacon) has been described in detail with reference to FIG. 7.

Meanwhile, the step S817 may be determined by the service server not the user equipment (S822). That is, the service server determines whether the user equipment is located near the display device, by using the RSSI value received from the user equipment within the other scope of the present invention.

One of another features of the present invention determines a display status of the user equipment (S818). If the display of the user equipment is on-state, since it may be estimated that a user looks at the user equipment, the display device (ex: signage) is designed so as not to provide user customized contents. Therefore, it is advantageous that battery consumption caused by unnecessary data transmission or display may be avoided.

On the contrary, if the display of the user equipment is off-state, since the user does not use the user equipment, the display device (ex: signage) is designed so as to provide user customized contents. That is, the user equipment transmits user information, BD address, and the like to the service server (S819), and the service server accesses the contents server to obtain contents information specialized for a specific user (S823).

Meanwhile, a scenario that a display device provides contents specialized for an owner of a specific mobile device will be described in more detail with reference to FIG. 10.

FIG. 10 is other example of a flow chart illustrating an operation flow of respective elements within a system according to one embodiment of the present invention. For reference, flows of FIGS. 8, 9 and 10 are performed in due order. However, for convenience of description, FIG. 8, FIG. 9 and FIG. 10 will be described respectively. Also, FIGS. 8 to 10 may be construed complementarily with reference to FIGS. 1 to 7 within the scope of the present invention.

A description will be made based on the steps shown in FIG. 9. The contents server identifies a display device associated with a corresponding beacon with reference to the database shown in FIGS. 2 and 3 and identifies a user by using UUID of the user equipment, in which communication with the beacon is performed (S831).

The contents server determines whether a user has previously registered a matter of interest through a related application (S832).

As a result of the step S832, if the matter of interest is not registered, the contents server automatically extracts customized contents on the basis of personal information (for example, gender, age, etc.) of the user (S833).

On the contrary, as a result of the step S832, if the matter of interest is registered, the contents server extracts user customized contents on the basis of a matter of interest keyword (S834).

Scheduling for transmission of the contents extracted at the step S833 or the step S834 is required, and is previously set or changed in accordance with a request of the user (S835).

Also, the contents server transmits the contents extracted at the step S833 or the step S834 to the display device in accordance with the schedule determined at the step S835 (S836), and the display device that has received the contents is designed to display user customized contents (S841).

The embodiments that the display device outputs a specific content depending on whether the mobile device has approached the display device have been described with reference to the previous drawings. On the other hand, an embodiment that a type, size, etc. of a content output from a display device are automatically changed by subdividing whether the mobile device has approached the display device will be described with reference to FIG. 11.

FIG. 11 illustrates that a display device according to one embodiment of the present invention provides different contents in accordance with a proximity distance of a mobile device.

As shown in (a) of FIG. 11, a display device 1150 identifies proximity at three levels. That is, the display device 1150 may determine proximity of the mobile device 1100 in accordance with RSSI signal strength recognized through communication with beacons installed near the display device 1150.

For example, as shown in (a) of FIG. 11, if it is determined that the mobile device 1100 is located in a first area spaced apart from the display device 1150 (on the basis of RSSI signal strength), the display device 1150 outputs only information on one advertisement. Also, since the mobile device 1100 is relatively far away from the display device, a text size may be increased within the scope of the present invention.

On the other hand, as shown in (b) of FIG. 11, if it is determined that the mobile device 1101 is located in a third area spaced apart from the display device 1151 (on the basis of RSSI signal strength), the display device 1151 outputs information on a plurality of advertisements. Also, since the mobile device 1101 is relatively close to the display device, a text size may be reduced within the scope of the present invention.

Figure 12:
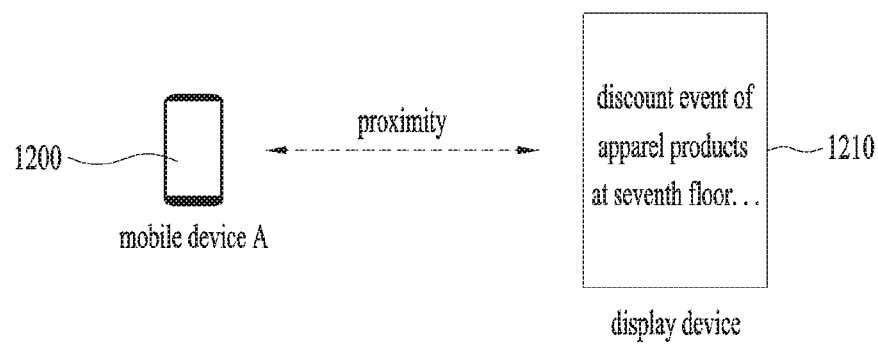
FIG. 12 illustrates an example that a display device according to one embodiment of the present invention provides different contents in accordance with a type of a mobile device.

FIG. 12 illustrates an example that a display device according to one embodiment of the present invention provides different contents in accordance with a type of a mobile device.

If it is recognized that a mobile device 'A' 1200 approaches the display device 1210, the display device 1210 extracts contents preferred by a user of the mobile device 'A' 1200 by using UUID of the mobile device 'A' 1200 and displays position information where the extracted contents are located. The position information may be extracted with reference to the database shown in FIG. 3.

Figure 13:
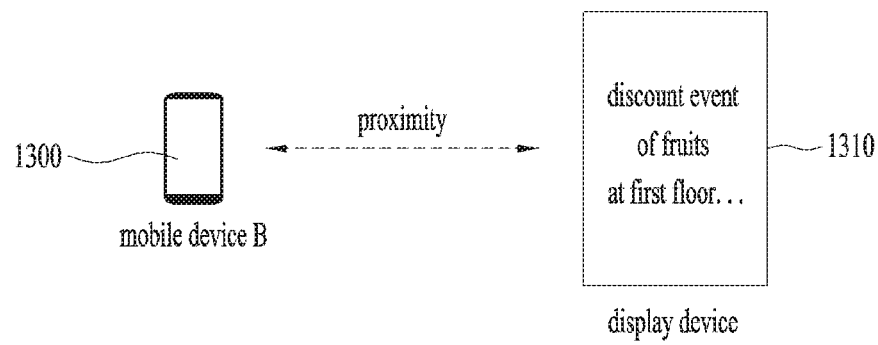
FIG. 13 illustrates another example that a display device according to one embodiment of the present invention provides different contents in accordance with a type of a mobile device.

FIG. 13 illustrates another example that a display device according to one embodiment of the present invention provides different contents in accordance with a type of a mobile device. Although FIG. 12 and FIG. 13 are identical to each other in that the mobile device has approached the display device, another content is output through the display device in accordance with approach of another mobile device.

That is, if it is recognized that a mobile device 'B' 1300 approaches the display device 1310, the display device 1310 extracts contents preferred by a user of the mobile device 'B' 1300 by using UUID of the mobile device 'B' 1300 and displays position information where the extracted contents are located. The position information may be extracted with reference to the database shown in FIG. 3.

In comparison between FIGS. 12 and 13, "apparel products" information preferred by the user of the mobile device 'A' and "position information (seventh floor)" are output through the display device in FIG. 12, whereas "fruits" information preferred by the user of the mobile device 'B' and "position information (first floor)" are output through the same display device.

FIG. 14 illustrates that a display device according to one embodiment of the present invention provides different contents in accordance with a proximity speed of a mobile device.

Contents control is performed in accordance with a distance at a specific time between the mobile device and the display device in the aforementioned embodiments, whereas a play time of a content is controlled in accordance with a speed of the mobile device which approaches the display device instead of a specific time or a content of an optimized play time is provided in the embodiment of FIG. 14.

First of all, as shown in (a) of FIG. 14, if it is calculated that a random mobile device 1400 approaches a display device 1410 at a speed of 'A', the display device 1410 plays a content 'a' corresponding to about 10 seconds.

Meanwhile, as shown in (b) of FIG. 14, if it is calculated that a random mobile device 1401 approaches a display device 1411 at a speed of 'B', the display device 1411 plays a content 'b' corresponding to about 5 seconds. As described above, a moving speed may be calculated through a motion sensor inside the mobile device 1401. Also, the mobile device 1401 may directly transmit the calculated moving speed to the display device 1411 or transmit the calculated moving speed to a server and the server determines a content according to the moving speed of the mobile device to transmit the determined content to the display device 1411 within the other scope of the present invention.

Figure 15:
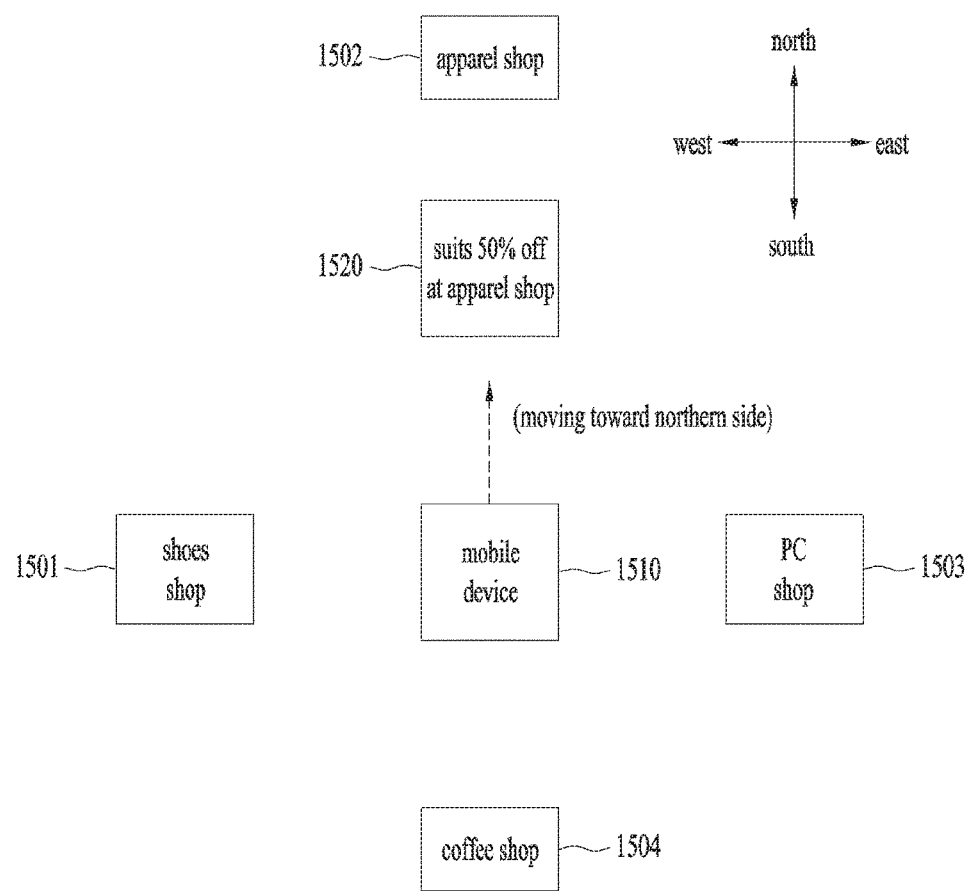
FIG. 15 illustrates that a display device according to one embodiment of the present invention provides different contents considering a moving direction of a mobile device.

FIG. 15 illustrates that a display device according to one embodiment of the present invention provides different contents considering a moving direction of a mobile device.

In the aforementioned embodiments, the display device provides different contents in accordance with preference of a user who uses the mobile device, approaching speed, or approaching distance.

However, according to FIG. 15 which will be described later, the display device is designed to first display specific product information considering a direction for which the mobile device is headed.

First of all, the display device 1520 shown in FIG. 15 has position information near a place where the display device 1520 is installed. The position information includes information on shops located at all directions based on the display device 1520.

In more detail, position information (for example, map information) is stored in a memory of the display device 1520 or through communication with a server, wherein the position information indicates that a shoes shop 1501 is located at a west side based on the display device 1520, an apparel shop 1502 is located at a northern side based on the display device 1520, a PC shop 1503 is located at an east side based on the display device 1520, and a coffee shop 1504 is located at a southern side based on the display device 1520.

Therefore, through communication between the mobile device 1510 and the display device 1520, the display device 1520, which has received information indicating that the mobile device 1510 is moving toward a northern direction, first displays information on a specific product sold in a shop located at the northern side, that is, the apparel shop 1502 with reference to the memory. Of course, the display device 1520 may be designed to directly detect information on a moving direction of the mobile device 1510 within the other scope of the present invention.

The terminologies used in the present invention are defined considering their functions in the present invention, and may be modified depending on intention of a person skilled in the art, or practices. Therefore, the terminologies should be defined based on the meaning lying within the description disclosed herein.

The aforementioned present invention may be implemented in a recording medium, in which a program is recorded, as a code that can be read by the computer. The recording medium that can be read by the computer includes all kinds of recording media in which data that can be read by a computer system are stored. Examples of the recording medium include a hard disk drive (HDD), a solid state disk (SSD), a silicon disk drive (SDD), a ROM, a RAM, a CD-ROM, a magnetic tape, a floppy disk, and an optical data memory. Also, another example of the recording medium may be implemented in a shape of carrier wave (for example, transmission through Internet). Also, the computer may include a controller of a wearable device. Therefore, the above detailed description is to be considered in all respects as illustrative and not restrictive. The scope of the present invention should be determined by reasonable interpretation of the appended claims and all changes which come within the equivalent scope of the present invention are included in the scope of the present invention.

Various modifications and changes can be made in the present invention by those skilled in the art without limitation to the aforementioned embodiments, and all changes coming within the meaning and equivalency range of the appended claims are intended to be embraced therein.

What is claimed is:

1. A display device comprising:
   a memory;
   a display module;
   a communication module performing communication with at least one server; and
   a controller operably coupled with the memory, the display module, and the communication module, wherein the controller is configured to:
cause the display module to output different contents in accordance with a distance between a mobile device and the display device; and
change a playtime of content output through the display module based on at least one of a moving direction or a speed of the mobile device.

2. The display device according to claim 1, wherein:
the controller is further configured to change a specific content output through the display module in accordance with position information of the mobile device; and
the position information of the mobile device is determined using relative signal strength between at least two short distance communication modules installed near the display device and the mobile device.

3. The display device according to claim 2, wherein if a difference between a first absolute value of signal strength between a first short distance communication module and the mobile device and a second absolute value of signal strength between a second short distance communication module and the mobile device corresponds to a predetermined range, then the mobile device is located in an area of interest of the display device.

4. The display device according to claim 3, wherein the area of interest is grouped by a plurality of areas in accordance with signal strength.

5. The display device according to claim 3, wherein the first short distance communication module and the second short distance communication module correspond to beacons that enable Bluetooth communication, and are installed near the display device.

6. The display device according to claim 1, wherein:
the communication module receives a specific content corresponding to ID of the mobile device from the at least one server; and
the controller is further configured to cause the display module to output the received specific content.

7. The display device according to claim 1, wherein the controller is further configured to cause the display module to selectively output the content in accordance with a display-on/off of the mobile device.

8. The display device according to claim 1, wherein the display device corresponds to at least one of a digital signage, a monitor, or a Television (TV).

* * * * *